(12) United States Patent
Knollenberg et al.

(10) Patent No.: US 10,928,293 B2
(45) Date of Patent: Feb. 23, 2021

(54) DETECTING NANOPARTICLES ON PRODUCTION EQUIPMENT AND SURFACES

(71) Applicant: Particle Measuring Systems, Inc., Boulder, CO (US)

(72) Inventors: Brian A. Knollenberg, Boulder, CO (US); Daniel Robert Rodier, Boulder, CO (US)

(73) Assignee: Particle Measuring Systems, Inc., Boulder, CO (US)

(*) Notice: Subject to any disclaimer, the term of this patent is extended or adjusted under 35 U.S.C. 154(b) by 0 days.

(21) Appl. No.: 16/559,074

(22) Filed: Sep. 3, 2019

(65) Prior Publication Data

US 2020/0072724 A1 Mar. 5, 2020

Related U.S. Application Data

(60) Provisional application No. 62/726,851, filed on Sep. 4, 2018.

(51) Int. Cl.
*G01N 15/06* (2006.01)
*G01N 21/05* (2006.01)
(Continued)

(52) U.S. Cl.
CPC ........... *G01N 15/065* (2013.01); *G01N 21/05* (2013.01); *B82Y 35/00* (2013.01); *G01N 2015/0038* (2013.01)

(58) Field of Classification Search
CPC ................ G01N 15/065; G01N 21/05; G01N 2015/0038; B82Y 35/00
See application file for complete search history.

(56) References Cited

U.S. PATENT DOCUMENTS

| 4,594,715 A | 6/1986 | Knollenberg |
| 4,728,190 A | 3/1988 | Knollenberg |
(Continued)

FOREIGN PATENT DOCUMENTS

| JP | 2003035652 A | 2/2003 |
| TW | 201905465 A | 2/2019 |
| WO | WO 2018/236584 A1 | 12/2018 |

OTHER PUBLICATIONS

Bouhelier et al. (2003) "Near-Field Second-Harmonic Generation Induced by Local Field Enhancement," Phys. Rev. Lett. 90(1): 013903-1-013903-4.

(Continued)

*Primary Examiner* — Jamil Ahmed
(74) *Attorney, Agent, or Firm* — Leydig, Voit & Mayer, Ltd.

(57) ABSTRACT

Provided herein is a particle analyzer that is operably connected to a probe unit that is capable of both dislodging particles from a surface and sampling the particles after they have been dislodged. The devices and methods described herein may be lightweight and/or handheld, for example, so that they may be used within a cleanroom environment to clean and sample permanent surfaces and tools. The devices may include optical particle counters that use scattered, obscured or emitted light to detect particles, including condensation particle counting systems or split detection optical particle counters to increase the sensitivity of the device and thereby facilitate detection of smaller particles, while avoiding the increased complexity typically required for the detection of nanoscale particles, such as particles less than 100 nm in effective diameter.

33 Claims, 2 Drawing Sheets

(51) Int. Cl.
*B82Y 35/00* (2011.01)
*G01N 15/00* (2006.01)

(56) References Cited

U.S. PATENT DOCUMENTS

| | | | |
|---|---|---|---|
| 4,798,465 A | 1/1989 | Knollenberg | |
| 4,893,928 A | 1/1990 | Knollenberg | |
| 4,987,767 A | 1/1991 | Corrigan et al. | |
| 5,039,349 A | 8/1991 | Schoeppel | |
| 5,282,151 A | 1/1994 | Knollenberg | |
| 5,283,199 A | 2/1994 | Bacon, Jr. et al. | |
| 5,671,046 A | 9/1997 | Knowlton | |
| 5,726,753 A | 3/1998 | Sandberg | |
| 5,751,422 A | 5/1998 | Mitchell | |
| 5,805,281 A | 9/1998 | Knowlton et al. | |
| 5,861,950 A | 1/1999 | Knowlton | |
| 5,889,589 A | 3/1999 | Sandberg | |
| 5,903,338 A | 5/1999 | Mavliev et al. | |
| 6,167,107 A | 12/2000 | Bates | |
| 6,246,474 B1 | 6/2001 | Cerni et al. | |
| 6,275,290 B1 | 8/2001 | Cerni et al. | |
| 6,615,679 B1 | 9/2003 | Knollenberg et al. | |
| 6,709,311 B2 | 3/2004 | Cerni | |
| 6,859,277 B2 | 2/2005 | Wagner et al. | |
| 6,887,710 B2 | 5/2005 | Call et al. | |
| 6,903,818 B2 | 6/2005 | Cerni et al. | |
| 6,945,090 B2 | 9/2005 | Rodier | |
| 7,030,980 B1 | 4/2006 | Sehler et al. | |
| 7,088,446 B2 | 8/2006 | Cerni | |
| 7,088,447 B1 | 8/2006 | Bates et al. | |
| 7,208,123 B2 | 4/2007 | Knollenberg et al. | |
| 7,235,214 B2 | 6/2007 | Rodier et al. | |
| RE39,783 E | 8/2007 | Cerni et al. | |
| 7,456,960 B2 | 11/2008 | Cerni et al. | |
| 7,528,959 B2 | 5/2009 | Novotny et al. | |
| 7,576,857 B2 | 8/2009 | Wagner | |
| 7,667,839 B2 | 2/2010 | Bates | |
| 7,746,469 B2 | 6/2010 | Shamir et al. | |
| 7,796,255 B2 | 9/2010 | Miller | |
| 7,916,293 B2 | 3/2011 | Mitchell et al. | |
| 7,973,929 B2 | 7/2011 | Bates | |
| 7,985,949 B2 | 7/2011 | Rodier | |
| 8,027,035 B2 | 9/2011 | Mitchell et al. | |
| 8,109,129 B2 | 2/2012 | Gorbunov | |
| 8,154,724 B2 | 4/2012 | Mitchell et al. | |
| 8,174,697 B2 | 5/2012 | Mitchell et al. | |
| 8,427,642 B2 | 4/2013 | Mitchell et al. | |
| 8,800,383 B2 | 8/2014 | Bates | |
| 8,869,593 B2 | 10/2014 | Gorbunov et al. | |
| 9,631,222 B2 | 4/2017 | Ketcham et al. | |
| 9,638,665 B2 | 5/2017 | Gorbunov | |
| 9,682,345 B2 | 6/2017 | Gromala et al. | |
| 9,808,760 B2 | 11/2017 | Gromala et al. | |
| 9,810,558 B2 | 11/2017 | Bates et al. | |
| 9,885,640 B2 | 2/2018 | Ketcham et al. | |
| 9,989,462 B2 | 6/2018 | Lumpkin et al. | |
| 10,197,487 B2 | 2/2019 | Knollenberg et al. | |
| 10,345,200 B2 | 7/2019 | Scialo et al. | |
| 10,371,620 B2 | 8/2019 | Knollenberg et al. | |
| 10,792,694 B2 | 10/2020 | Gorbunov et al. | |
| 2002/0083780 A1 | 7/2002 | Lutz et al. | |
| 2003/0015045 A1* | 1/2003 | Yoshida | G01N 15/0656 73/865.5 |
| 2004/0012772 A1* | 1/2004 | Ahn | G01N 15/065 356/37 |
| 2005/0028593 A1 | 2/2005 | Rodier | |
| 2007/0030492 A1 | 2/2007 | Novotny et al. | |
| 2009/0078862 A1 | 3/2009 | Rodier et al. | |
| 2009/0128810 A1 | 5/2009 | Bates | |
| 2009/0190128 A1 | 7/2009 | Cerni et al. | |
| 2009/0257057 A1* | 10/2009 | Novotny | B82Y 35/00 356/338 |
| 2009/0268202 A1 | 10/2009 | Wagner | |
| 2009/0323061 A1 | 12/2009 | Novotny et al. | |
| 2011/0132108 A1* | 6/2011 | Novosselov | G01N 1/2202 73/863.22 |
| 2015/0000595 A1 | 1/2015 | Gorbunov et al. | |
| 2015/0259723 A1 | 9/2015 | Hartigan et al. | |
| 2015/0260628 A1 | 9/2015 | Shamir | |
| 2016/0126081 A1 | 5/2016 | Gorbunov | |
| 2016/0139013 A1 | 5/2016 | Gorbunov | |
| 2017/0176312 A1 | 6/2017 | Shamir | |
| 2017/0350801 A1 | 12/2017 | Knollenberg et al. | |
| 2018/0224475 A1 | 8/2018 | Browne et al. | |
| 2019/0250785 A1 | 8/2019 | Pandolfi et al. | |
| 2019/0323943 A1 | 10/2019 | Knollenberg et al. | |
| 2019/0346345 A1 | 11/2019 | Scialo et al. | |
| 2020/0072729 A1 | 3/2020 | Lumpkin et al. | |
| 2020/0150017 A1 | 5/2020 | Bates et al. | |
| 2020/0150018 A1 | 5/2020 | Shamir | |
| 2020/0158603 A1 | 5/2020 | Scialo et al. | |
| 2020/0158616 A1 | 5/2020 | Knollenberg et al. | |
| 2020/0240896 A1 | 7/2020 | Karasikov et al. | |

OTHER PUBLICATIONS

Bouhelier et al. (2003) "Near-field scattering of longitudinal fields," Applied Physics Letters 82(25): 4596-4598.

Goldberg et al. (2002) "Immersion lens microscopy of photonic nanostructures and quantum dots," IEEE Jour. of Selected Topics in Quantum Electronics 8(5): 1051-1059.

Ignatovich et al. (2006) "Real-Time and Background-Free Detection of Nanoscale Particles," Phys. Rev. Lett. 96: 013901-1-013901-4.

Search Report and Written Opinion, dated Dec. 5, 2019, corresponding to International Application No. PCT/US2019/049328 (filed Sep. 3, 2019), 9 pp.

Taiwanese Office Action and Search Report with English translation, issuance date of Jun. 9, 2020, corresponding to Taiwan Patent Application No. 108131754, 22 pp.

U.S. Appl. No. 16/857,678, filed Apr. 24, 2020.

* cited by examiner

DETECTING NANOPARTICLES ON PRODUCTION EQUIPMENT AND SURFACES

CROSS REFERENCE TO RELATED APPLICATIONS

This application claims the benefit of priority to U.S. Provisional Patent Application No. 62/726,851 filed Sep. 4, 2018, which is incorporated herein by reference in its entirety to the extent not inconsistent herewith.

BACKGROUND OF THE INVENTION

Advancement of the various technologies requiring cleanroom manufacturing has led to a desire for the detection of smaller and smaller particles. Both microelectronic foundries and pharmaceutical/biological cleanrooms are beginning to seek detection of particles less than 20 nm in size as they may affect the increasingly sensitive manufacturing processes.

Smaller particles, specifically particles less than 100 nm, can pose additional difficulties for maintaining a cleanroom environment because they are much more likely to interact or adhere to a surface within the cleanroom environment due to electrostatic, physical, chemical or magnetic forces between the particle and the surface. At very small particle sizes, the mass of the particle is sufficiently low such that particle-surface interactions such as electrostatics, hydrogen bonding, Van der Waals forces, chemical adsorption and the like can cause the particle to stick to the surfaces within the cleanroom environment.

It is often desirable to remove and simultaneously capture and/or detect particles on surfaces in cleanroom environments. For examples, tools and other devices may need to be removed from the protected environment for maintenance or replacement and need to be checked for nanoscale particles before use as the particles may dislodge from surfaces of the tool and interfere with the manufacturing process. Some surfaces may be permanent fixtures within the cleanroom and need to be periodically cleaned and scanned for nanoscale particles.

Condensation particle counters and split differential interferometric particle counters may provide less expensive or more accurate solutions than scattered light particle counters. Traditional scattered light optical particle counters require exponentially more energy (typically provided in the form of laser) in order to reduce the detectable diameter of particles being analyzed. For example, condensation particle counters increase the perceived diameter of the particles being analyzed and split differential interferometric detectors manipulate the laser source into two beams and use interferometry to analyze the interaction of the two beams to reduce the energy required to detect particles at a given diameter. These techniques dramatically decrease the power required for detection systems, and, therefore, decrease the cost of particle detection systems as well as the size of the detector.

Conventional condensation particle counters (also referred to a condensation nuclei counters) allow for the detection of small particles using relatively low sensitivity particle counter systems, for example optical particle counters, by increasing detectability of the particle by condensing a vapor into a liquid on the particles' surface, increasing the apparent volume of the particle. Typically, a sample to be analyzed enters the condensation particle counter system through a flow control device (e.g. a flow orifice) and into a saturator where the sample is mixed with a concentration of condensate primarily in the vapor form. The saturator is in fluid communication with a condensate reservoir which provides condensate to the saturator, where it is heated to ensure it is sufficiently in the vapor phase. The sample stream, now mixed with condensate vapor, then flows into a condenser which cools the sample stream, causing the condensate to condense as a liquid around particles contained in the sample stream, thereby enlarging the perceived particle by creating a layer of liquid around the particle. The sample stream is then provided to a particle detection system, such as an optical particle counter, which more easily detects the particle due to the larger signature caused by the liquid layer. Examples of condensation particle counter systems are provided in U.S. Pat. No. 5,903,338 and US Patent Pub. No. 2017/0350801, both of which are incorporated by reference in their entirety.

Split differential interferometric optical particle counters split the electromagnetic radiation into at least two beams. One beam enters the target being analyzed (e.g. flow chamber, surface, etc.) and interacts with any particles. The beam is then directed in a way that it intersects and interacts with the second beam. Particles may be detected by measuring the interference or interaction between the two beams. This technique enhances sensitivity of the particle counter. The increased sensitivity allows for detection of smaller particles relative to the power requirement of the optical or laser source, potentially decreasing size and cost of the particle counter while still allowing for detection of nanometer scale particles.

It can be seen from the foregoing that there remains a need in the art for devices and methods capable of the removal of nanoscale particles from surfaces while capturing and analyzing the particles. In some cases, it may be desirable to have lightweight devices capable of handheld operation such that they can be used on the various surfaces within a cleanroom or sterile environment.

BRIEF SUMMARY OF THE INVENTION

Significant forces may be required to dislodge or remove particles from a surface, including for nanoscale-sized particles (e.g., particles having an effective or average diameter less than 1 μm, less than 100 nm, or less than 20 nm). A combination of electrostatic, chemical, physical and magnetic forces may be responsible for causing nanoscale particles to adhere or stick to various surfaces depending on, among other things, composition of both the particle and surface, size of the particle, chemical structure of the particle (e.g. presence of —OH bonds, polarity, electronegativity, etc.) and/or magnetic properties of both the particle and surface. The devices and methods described herein address this fundamental problem of measuring surface-adherent particles, including nanoparticles, by providing any of one or more various types of energy or mass that are sufficient to reliably overcome the attractive forces between the surface and the particles, thereby dislodging the particles, and collecting them for accurate and sensitive characterization by a particle analyzer, including a particle counter. The devices and methods described herein provide a fundamental platform for sensitive and reliable detection of surface-adherent particles that may otherwise not be detected, which is important in a range of industries where such particles can adversely interfere with the underlying manufacturing process, including for cleanroom applications, such as microelectronic and pharmaceutical manufacture.

Provided herein are devices and methods for the removal and detection of particles on a surface, preferably nano-sized particles or "nanoparticles". Depending on the application of interest, the devices and methods may be configured to detect particles having a characteristic size or effective diameter less than 1 µm, preferably less than 100 nm, or more preferably less than 20 nm. Similarly, the devices and methods are compatible with any of a range of surface types and compositions, depending on the application of interest, including a surface associated with production equipment and/or a facility surface.

Provided herein are devices comprising a particle analyzer, such as a particle counter, that is operably connected to a probe unit that is capable of both dislodging particles from a surface and sampling the particles after they have been dislodged from the surface. The devices and methods described herein are preferably lightweight and/or handheld, for example, so that they may be used within a cleanroom environment to clean and sample permanent surfaces and tools in a mobile manner, where a user can readily move the probe to the desired surface. The described devices are compatible with non-optical and with optical particle counters. Representative non-optical particle counters include particle detection by non-optical means such as ultrasonic, electrochemical, single particle inductively coupled plasma mass spectrometry (ICP/MS), electrical (resistance and/or capacitance signals generated by particles passing an energized orifice, such as a Coulter counter), and the like.

Optical particle counters use scattered, obscured or emitted light to detect particles. The optical particle counter may utilize condensation particle counting systems or split detection optical particle counters to increase the sensitivity of the device (thereby allowing for the detection of smaller particles) while avoiding the increased complexity typically required for the detection of nanoscale particles, e.g., particles less than 100 nm in effective diameter.

The use of condensation particle counters for the application of surface removal and detection may be advantageous over other types of particle counters or analyzers (e.g. scattered or obscured light detectors) due to the lower power requirements provided by condensation particle counters. While condensation particle counters may use a similar form of light detection (e.g. scattered, obscured), the ability of the condensation aspect of the particle counter to increase the effective size (i.e. effective diameter, volume) of the particles by condensing a liquid on the surface of the particle means that the detection system needs only be capable of detecting an enlarged particle. For example, a scattered light optical particle counter would require orders of magnitude increases in the optical power source (e.g. laser) to detect a 10 nm particle than a condensation particle counter that could enlarge the effective diameter of the 10 nm particle to approximately 300 nm to 500 nm. This increased power requirement for the optical (typically laser) detector dramatically increases cost, size and frailty of the overall system, making design of handheld, lightweight high-sensitivity traditional particle counters problematic. This is one reason why it is preferable that the particle analyzer is a condensation particle counter, preferably an optical condensation particle counter.

Split detector particle counters may also be useful in decreasing the amount of laser energy required to detect particles in the nanometer range, for example, from 5 nm to 100 nm. By measuring the differential of the split beams of the laser source, the effectiveness and sensitivity of the optical particle counter may be increased relative to directly measuring the emitted or scattered light of a traditional particle counter.

Provided herein are devices for removal and detection of particles on a surface comprising: i) a particle analyzer, such as a particle counter, having an inlet; ii) a sample probe having a sampling port, wherein the sampling port is fluidically connected to the inlet of the condensation particle counter by a flow path; iii) an ejection system operably connected to the sample probe, wherein the ejection system is configured to direct matter, energy or a combination thereof onto the surface to dislodge the particles from the surface; and iv) a vacuum system operably connected to the sampling port such that the vacuum system is configured to force dislodged particles proximate to the sample probe through the sampling port, along the flow path and into the particle counter via the flow path.

"Proximate" refers to those particles that are in the vicinity of (e.g., adjacent to) the sample probe, such as particles dislodged that are immediately below the sample probe and positioned between the surface and the sample probe and is also referred herein as a "collection region". Of course, depending on the magnitude of the force acting to collect the dislodged particles, proximate can encompass some area around and adjacent to the sample probe, such as the area corresponding to the contact area of a housing surface that contains the sample probe, port and ejection system and that is immediately below the housing surface that faces the corresponding surface, and a small outer perimeter area thereof, such as less than 1 cm, less than 1 mm or less than 1 µm. This surrounding area of the proximate region may be small to minimize collection of unwanted particles outside the collection region (e.g., minimize counting particles in surrounding air and instead collects particles dislodged from the surface), but can be relatively larger for applications where the sample probe is being moved relatively quickly over the surface. The collection region proximate to the sample probe can be user-adjustable, such as by adjusting the vacuum power, and thereby increasing the collection region proximate to the sample probe, or reducing the vacuum power, thereby decreasing the size of the collection region. Similarly, the speed and distance from the surface that the probe is positioned will also influence collection region size and geometry. Slow and steady probe motion over a surface provides a relatively uniform collection region proximate to the sample probe that remains relatively constant over time and surface position.

The particle analyzer may be a particle counter, including an optical particle counter, preferably a condensation particle counter. The condensation particle counter inlet may introduce a sample stream containing the dislodged particles to be analyzed, and may, for example, comprise: a condensate reservoir; a saturator in fluid communication with the condensate reservoir for introducing a condensate into the sample stream; a condenser in fluid communication with the saturator for condensing the condensate onto the dislodged particles contained in the sample stream; and wherein the particle counter inlet is in fluid communication with the condenser for detecting or characterizing the condensed dislodged particles in the sample stream.

The particle counter systems described herein may use a condensate of water, methanol, ethanol, propanol, butanol, glycerol, ethylene glycol, diethelyene glycol, propylene glycol, or a combination thereof. The devices may detect particles having an effective diameter of less than or equal to 250 nm, less than or equal to 100 nm, or optionally, less than or equal to 50 nm. The devices may dislodge and detect particles selected from the range of 5 nm to 100 nm. The devices may be portable, for example, weighing less than 30 kg, 20 kg, or optionally, less than 10 kg while being in an operable condition, thereby allowing a user to move the device at-will without need for additional assistance.

The devices described herein may use a split differential interferometric optical particle counter. The particle counter may be configured such that the ejection system dislodges and the split differential interferometric optical particle counter detects particles selected from the range of 5 nm to 100 nm. The split differential interferometric optical particle counter may use a Gaussian or a non-Gaussian beam as an optical source.

The optical particle counter may be configured for differential optical detection. The differential optical detection may utilize a plurality of optical detectors each spatially mapped to different portions of an optical beam that interacts with the particle. At least a portion of the optical beam may be passed through a flow cell containing the particles and directed onto the plurality of optical detectors. The optical detectors may be each spatially mapped to portions of the optical beam that are not overlapping. The optical detectors may be configured for differential detection. The optical detectors may be configured for split beam detection differential detection. The optical beam may be a Gaussian beam, a non-Gaussian beam, a structured beam or an interferometric beam.

The ejection system is compatible with a range of ejection materials, and may direct energized matter to the surface. Energized matter as described herein may be selected from the group consisting of: compressed gas, ionized gas, pulsed gas, ultrasonic gas, megasonic gas, cryogenic gas, carbon dioxide snow and any combination thereof. Energized matter may comprise air, carbon dioxide, argon, nitrogen or any combination thereof. The ejection system may provide ultrasonic or megasonic energy to the surface. The ejection system may thermally excite the particles on the surface. The ejection system may alter the electrical charge of the particles (e.g. by providing ions) to the surface. The ejection system may eject atmospheric pressure plasma, which may be an air plasma or an Argon plasma (larger atom, greater momentum transfer for removing nanoparticles from surface), in the devices and methods for removing nanoparticles from surfaces.

The ejection system may pulse energy, matter or a combination thereof to facilitate the removal of particles from the surface. The ejection system may use a pulsed liquid and the optical particle counter may be a liquid optical particle counter. The pulsed liquid may include one or more surfactants. Representative surfactants include, but are not limited to, ionic, non-ionic and/or anionic surfactants, such as Polysorbate (such as polyoxyethylene-sorbitan-20 monooleate) and/or sodium dodecyl sulfate (SDS).

The probe as described herein may be handheld or machine controlled and may be connected to the inlet by a flexible hose or tube. As known in the art, the flexible hose or tube are configured to ensure there is minimal particle interaction with the wall. For example, the hose or tube wall may be configured to be static-free, such as formed of an electrically conductive material, thereby minimizing risk of dislodged particles interacting with the wall and attendant potential undercounting. For portable manual handheld devices, the particle counter component portion may be lifted with one hand, and the probe portion controlled by the other hand and moved over the surface by hand. In this manner, it is preferable that the ejection system is integrated with the probe portion.

Any of the devices described herein may be used in various methods, including for methods for removing and characterizing nanoparticles on a surface. A method for removing and characterizing particles on a surface may comprise: directing matter, energy or a combination thereof at the surface to dislodge nanoparticles from the surface; vacuuming the dislodged particles through a sample probe and into an inlet of a particle analyzer or counter; and characterizing the particles with the particle analyzer or counter.

Another method for removing and characterizing particles on a surface may comprise the steps of: providing a device comprising: a condensation particle counter having an inlet; a sample probe having a sampling port, wherein the sampling port is fluidically connected to the inlet of the condensation particle counter by a flow path; an ejection system operably connected to the sampling probe, wherein the ejection system directs matter, energy or a combination thereof onto the surface to dislodge the particles from the surface; and a vacuum system operably connected to the sampling port such that the vacuum system forces particles proximate to the sample probe through the sampling port and into the condensation particle counter via the flow path. The method may further comprise directing matter, energy or a combination thereof at the surface from the ejection system to thereby dislodge particles from the surface; vacuuming the dislodged particles through the sample port in the sample probe and into a condensation particle counter via the flow path; and characterizing the particles using the condensation particle counter.

Characterizing the particles may comprise detecting or counting the particles. The detecting or characterizing may correspond to providing a particle present or absence condition; number of particles per unit surface area or particle concentration on the surface (e.g., number of particles/area such as $mm^2$, $cm^2$, etc.); a total number of particles on the surface; total number of particles on a tool; a particle size; particle size range(s); and any combination thereof, such as number of particles in selected size bins, for example, less than 5 nm, between 5 nm and 20 nm, between 20 and 50 nm, between 50 nm and 100 nm, and greater than 100 nm, etc; particle cleaning efficacy such as a measure of percent extraction from the cleaning process (total particles after cleaning)/(total particles before cleaning) such that lower percentages reflect better cleaning than relatively higher percentages or any functionally equivalent measure; histogram of particle sizes; and any combination thereof.

A condensation particle counter may comprise: i) an inlet for introducing a sample stream to be analyzed; ii) a saturator for introducing a condensate into the sample stream; wherein the saturator is in fluid communication with a condensate reservoir; iii) a condenser in fluid communication with the saturator for condensing the condensate onto particles contained in the sample stream; and iv) a particle counter in fluid communication with the condenser for detecting or characterizing the particles in the sample stream.

Ejecting or dislodging the particles from the surface may include: directing a fluid at the surface; directing energy at the surface; directing carbon dioxide snow at the surface; directing ultrasonic or megasonic energy at the surface or thermally exciting particles on the surface. The fluid may comprise air, carbon dioxide, argon, nitrogen or any combination thereof. Directing the fluid at the surface may include: pulsing the fluid; energizing the fluid; ionizing the fluid; or providing the fluid at a cryogenic temperature. Directing energy at the surface may use energy that is provided at an ultrasonic or a megasonic frequency.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

DETAILED DESCRIPTION OF THE INVENTION

Figure 1:
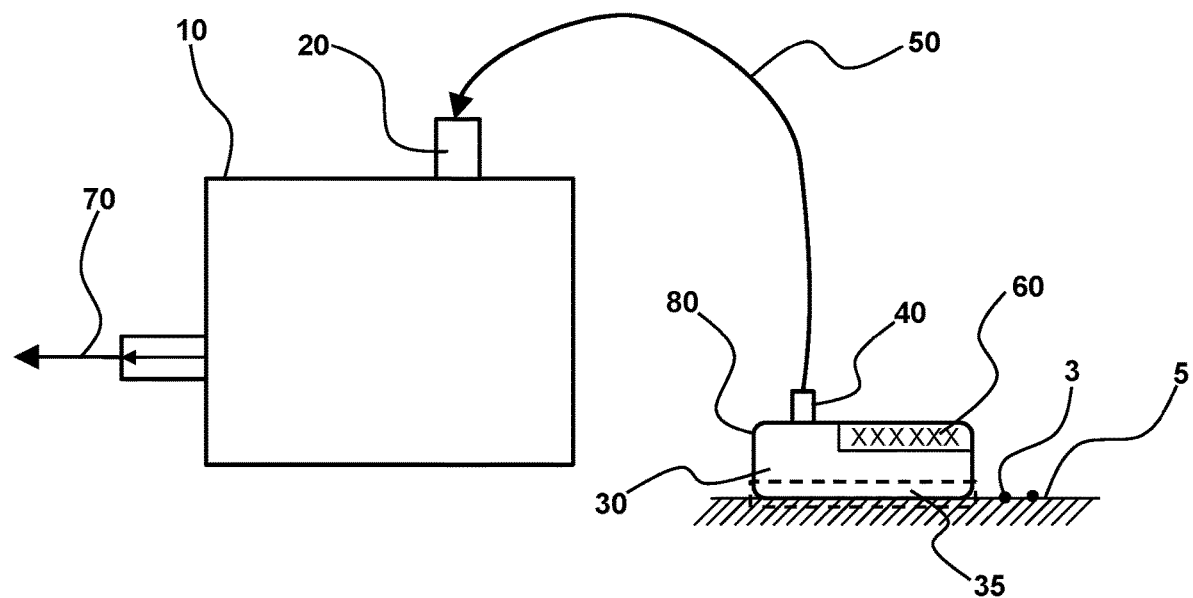
FIG. 1 is a schematic illustration of a device for removal and detection of particles on a surface

In general, the terms and phrases used herein have their art-recognized meaning, which can be found by reference to standard texts, journal references and contexts known to those skilled in the art. The following definitions are provided to clarify their specific use in the context of the invention.

"Particle analyzer" is used broadly herein to refer to an instrument that provides a useful particle parameter. Examples include, but are not limited to coulter counters, mass spectrometers, microscopic detection, flow cytometry, laser diffraction, dynamic light scattering, sedimentation, impactors, preferably particle counters, and more preferably optical particle counters.

"Optical particle counter," as used herein, refers to any device that uses optical detection to detect, count or characterize particles, typically by analyzing a surface or a fluid flow chamber. Optical particle counters provide a beam of electromagnetic radiation (such as by a laser) into the analysis area, where the beam interacts with any particles and then detects the particles based on changes to the beam. Detection may focus on electromagnetic radiation that is scattered, obscured or emitted by the particles. Various detectors for optical particle counters are known in the art, including for example, single detection systems, detector arrays, cameras, various detector orientations, etc. Optical particle counter includes condensation particle counters, condensation nuclei counters, split beam differential systems and the like. When used in the context of a condensation particle counter, the particle counter portion refers to the detection system (e.g. source of electromagnetic radiation, optics, filters, optical collection, detector, processor, etc.). "Non-optical" particle counters refers to a device that uses non-optical means, such as electrical, electrochemical, mass spectrometry and the like.

"Condensation particle counter" is used synonymously with condensation nuclei counter and refers to a particle detector or analyzer that deposits a fluid on the surface of the particles prior to detection to increase their effective size in order to detect particles smaller than would otherwise be detectable by the detection system. Example condensation particle counters are described in U.S. Pat. No. 5,903,338 and US Patent Pub. No. 2017/0350801, each of which are incorporated by reference in their entirety. Condensation particle counters may use optical detection systems, including scattered light detection systems. Various scattered light detection systems and improvement are known in the art.

"Ejection system" refers to a system for the removal, dislodging or forcing airborne particles or nanoparticles that are on a surface, including strongly or weakly adhered to the surface. The ejection system may provide mass or energy to overcome the forces (electrostatic, chemical, magnetic, etc.) which may cause small particles to stick or adhere to a surface. The ejection system may be operably connected to a sample probe, for example, a handheld puck or wand. The ejection system is compatible with any number of means for reliably dislodging surface-adherent particles, such as compressed gas, ionized gas, pulsed gas, megasonic gas, cryogenic gas, carbon dioxide snow, atmospheric pressure plasma (e.g., air plasma or argon plasma), and/or other materials to remove particles from a surface. The ejection system may provide ultrasonic or megasonic energy. The ejection system may also interact with the individual particles, for example, by providing thermal energy or changing the charge state of the particle. "Dislodge" refers to the application of the ejection system to sufficiently overcome the adhesive particle-surface interaction such that the particle is collected, including by the vacuum system. Accordingly, the ejection system is configured to specially dislodge particles in a reliable manner such that they are collected by the vacuum system, but not at such a large ejection velocity or dislodgment position that would risk overcoming the collection force generated by the vacuum system.

"Vacuum system" refers to a system for collecting particles after they have been ejected or dislodged from a surface and providing them to the condensation particle counter for detection or analysis. The vacuum system may be analogous to the ejection system (e.g. using the same process such as ionized gas) or it may be different. The vacuum system may be a compressed air suction system. The vacuum system may be operably connected to a sample probe, for example, the same probe as the ejection system or a different probe positioned to enhanced collection after ejection from the surface. The vacuum system may connect to a house line or may be portable, such as a portable vacuum pump.

"Operably connected" refers to a configuration of elements, wherein an action or reaction of one element affects another element, but in a manner that preserves each element's functionality. For example, an ejection system operably connected to the sample probe refers to attachment or integration such that the ejection system reliably dislodges particles from a surface that can be collected by the sample probe and provided to the particle analyzer inlet. Similarly, "fluidically connected" refers to a configuration of elements such that the elements are in fluid communication. For example, a sampling port fluidically connected to the inlet refers to a fluid, specifically dislodged particles suspended in a fluid such as air or a liquid, that is capable of flowing from the sampling port to the inlet.

"Split differential interferometric particle counter" or "split differential particle counter" refers to an optical particle counter that uses a differential measurement of multiple beams of electromagnetic radiation to increase the sensitivity of the particle counter over optical particle counter systems that directly detect electromagnetic radiation scattered, obscured or emitted by the particles. In some embodiments interferometry refers to the interaction of two beams. In these embodiments, a beam from an optical source is split into two or more separate beams. One beam interacts with the flow chamber or surface being analyzed for particles, then is directed back into the second beam. In some cases the two beams interact at the point of measurement (e.g. flow chamber, surface). The differential generated by the interaction between the two beams can be analyzed via interferometry to detect or characterize particles that interacted with the first beam. In some embodiments interferometry refers to differentially analyzing two or more detectors. For example, two or more detectors may be placed along the fluid flow path. By comparing the differential of the two detectors, a significant portion of the laser noise may be canceled. Representative examples include, but are not limited to, U.S. Pat. No. 7,746,469, U.S. Pub. Nos. 2015/0260628, 2017/0176312 and U.S. Pat. App. No. 62/838,835 filed Apr. 25, 2019 titled "Improved particle detection systems and methods." Each of these references are hereby incorporated in their entirety and specifically to illustrate particle counter system components and configurations that are useful for the detection of small particles.

Split differential interferometric particle counters may use Gaussian or non-Gaussian beams. Interferometric methods are known in the art, for example, as described in U.S. Pat. No. 7,528,959, US Patent Publications 2007/0030492 and 2009/0323061, Bouhelier, Phys. Review Letters, 90:1 & Goldberg, IEEE Jour. of Selected Topics in Quantum Electronics, 8:5, 1051-1059; Bouhelier et al. Applied Physics Letters, Vol. 82, No. 25, pp. 4596-4598, Jun. 23, 2003; Ignatovich, PRL 96, 013901 (2006), each of which is incorporated by reference in their entirety "Non-Gaussian Beam" refers to a beam of electromagnetic radiation (e.g. a laser) that has been modified such that the beam profile has a non-Gaussian distribution. Non-Gaussian beams be generated by techniques known in the art including modification of the laser cavity, combination of multiple beams into a single beam profile, spatial filters and the like.

The following examples further illustrate the invention but, of course, should not be construed as in any way limiting its scope.

Example 1

This example demonstrates a condensation particle counter with an attached ejection and sampling device (e.g. a sample puck or wand).

Described herein are systems and methods for monitoring of particles adhering to surfaces by adapting a condensation particle counter with a sample puck. The device generates a metered flow of filtered clean air and delivers it to the sample puck for dislodging particles from a surface. The resultant air stream with dislodged particles is then pulled from the sample puck into the condensation particle counter with a vacuum system. The vacuum system may utilize a matching flow rate to the dislodging flow rate. As particle size reduces, electrostatic and stiction characteristics make the particles progressively harder to eject from the surface for potential collection and counting. More aggressive particle removal techniques may be used to effectively remove them from surfaces. Some example removal techniques include: Metered air flow; Thermal excitation; Atmospheric ionization; Pulsed air flow; Ultra-sonic and megasonic pulsations; Metered fluid sprays with sample pre-conditioning; Supersonic $CO_2$ snow; Use of Ar or $N_2$ or a blend of cryogenic aerosol jet cleaning; Pulsed liquids, including use of surfactants Additionally, the sample probe may be configured as a sample puck specifically designed to reach difficult tool surface locations or other challenges. The sample puck and injection system may also be metered, for example, configured to measure volumetric or mass flow rate into or out of the system.

Referring to FIG. 1, a particle analyzer 10 has an inlet 20 for receiving a fluid sample that may contain particles 3 dislodged from a surface 5. A sample probe 30 is illustrated as a puck geometry, but can have any of a number of shapes depending on the application of interest, including a wand geometry, curved geometry, such as convex and/or concave, or combinations thereof. For example, the shape of the surface of the probe housing 80 may complement the shape of the surface 5 that the probe interacts with or be configured to be comfortably hand-held. The sample probe 30 has a sampling port 40 that is fluidically connected via a flow path 50 (e.g., tube or conduit) to the particle analyzer inlet 20. An ejection system 60 is operably connected to the sample probe 30, such as incorporated therein as shown. Alternatively, the ejection system 60 may be mounted or otherwise connected sample probe 30 so that movement of probe 30 provides a corresponding movement of ejection system 60, so that particle dislodged from surface 5 by ejection system 60 are collected by a vacuum system 70 in the collection region 35 proximate to the sample probe 30, as indicated by dashed region 35 of FIG. 1. For example, a surface of probe housing 80 may be concave with an outer perimeter raised to form a collection region that corresponds to a volume within the housing, where the vacuum action generated by vacuum 70 may be enhanced to ensure dislodged particle collection in region 35. As desired, various ports or openings in the housing 80 may ensure that the ejection system is able to interact with surface 5 and the collection means, such as vacuum 70, collects particles dislodged from surface 5, while minimizing risk of particles in the surrounding environment being collected and/or to avoid unwanted physical contact between housing 80 and surface 5.

Vacuum 70 may be an internally positioned pump or can be an externally positioned pump, such as via a vacuum line connected to house vacuum. As desired, the output air may be recirculated, such as air from the pump 70 that is filtered to remove particles and sent to the probe to provide another means of dislodging and/or facilitating particle collection, including by forming a type of air cushion between probe 30 and surface 5 to reduce unwanted physical contact between housing 80 and surface 5.

Figure 4:
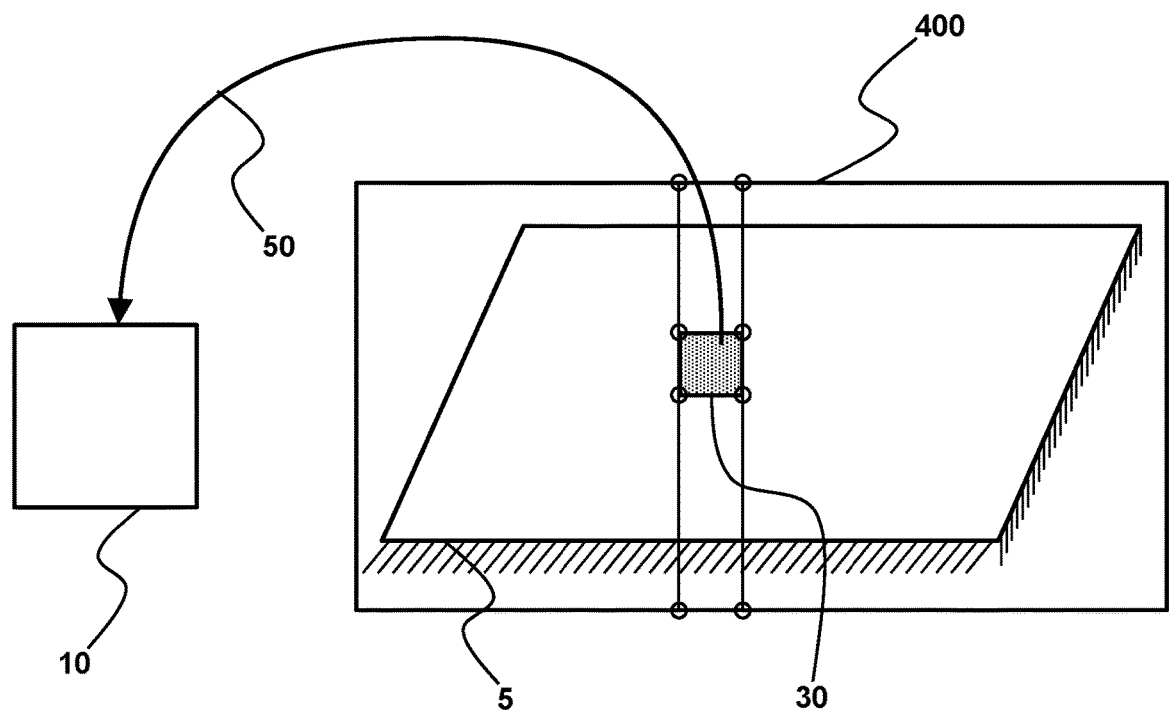
FIG. 4 is a schematic illustration of a machine controlled sample probe, such as on an x-y translation frame.

Probe housing 80 may be configured to be held by hand or may be controlled via machine 400 for automated movement that is machine controlled (FIG. 4). Sample probe can be in a puck configuration. Preferably, there is no or little physical contact between the sample probe and the surface, thereby minimizing risk of unwanted friction generating particles that may be inadvertently collected and detected as a contaminant particle. Clean air may be supplied around the outer edge so that the probe functionally rides on an air cushion between the surface and the probe housing, thereby avoiding or at least significantly reducing friction. The air may be recirculated filtered air output from the vacuum 70.

Figure 2:
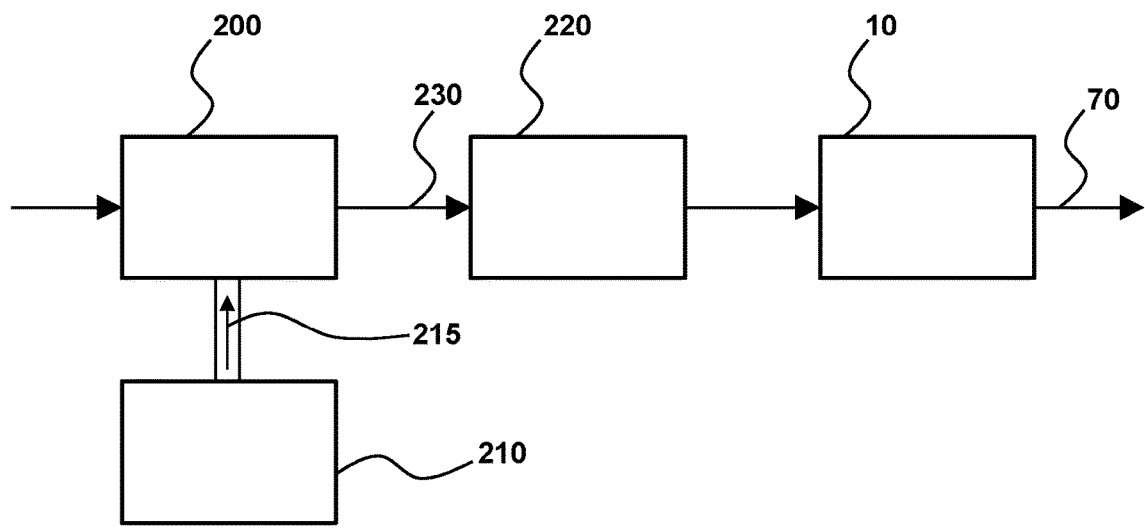
FIG. 2 is a schematic illustration of a condensation particle counter.

FIG. 2 illustrates a condensation particle counter with saturator 200 in fluid communication with condensate reservoir 210 for introducing condensate 215 into sample stream 230. Condenser 220 condenses the condensate 215 onto particles in the sample stream 230 and the sample stream with condensate on particles is introduced to the particle analyzer or counter 10. Vacuum system 70 may drive fluid stream through the particle analyzer or counter 10.

Figure 3:
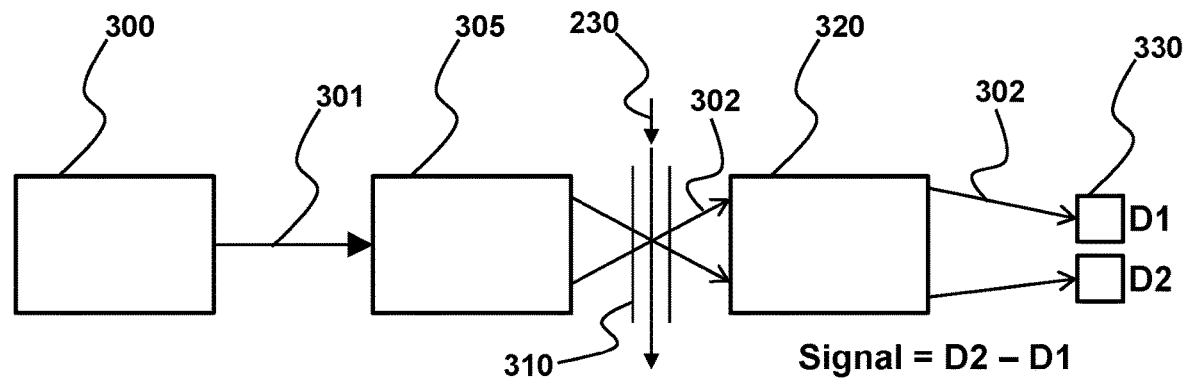
FIG. 3 is a schematic illustration of an optical particle counter.

FIG. 3 schematically illustrates various components of an optical particle counter. An optical source such as a laser 300 generates an optical beam 301 that optically interacts with focusing optics 305 before passing to fluid stream flow 230 in flow cell 310. Output optical beam 302 that has optically interacted with fluid stream 230 in flow cell 310 then optically interacts with collecting optics 320 that ensures the output beam 302 is directed onto a plurality of optical detectors 330 (illustrated as D1 and D2, but can vary from between 1-500 pairs for differential detection). The resultant signal for a split beam detection is the differential detection between D2 and D1.

FIG. 4 illustrates a sample probe 30 with ejection system connected to a machine controller 400, illustrated as an x-y translation stage controlled by stepper motors. In this manner, coverage of a surface area of surface 5 can be automatically and reliably controlled, with flow path 50 providing surface 5 dislodged particles to particle counter 10.

STATEMENTS REGARDING INCORPORATION BY REFERENCE AND VARIATIONS

All references, including publications, patent applications, and patents, cited herein are hereby incorporated by reference to the same extent as if each reference were individually and specifically indicated to be incorporated by reference and were set forth in its entirety herein.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The invention claimed is:

1. A device for removal and detection of nanoparticles on a surface comprising:
   a particle analyzer having an inlet;
   a sample probe having a sampling port, wherein said sampling port is fluidically connected to said inlet by a flow path;
   an ejection system operably connected to said sample probe, wherein said ejection system is configured to direct energized matter, energy or a combination of energized matter and energy onto said surface to dislodge said nanoparticles from said surface, wherein said dislodged nanoparticles have an effective diameter less than or equal to 100 nm; and
a vacuum system operably connected to said sampling port, wherein said vacuum system is configured to force said dislodged nanoparticles in a collection region proximate to said sample probe through said sampling port, along said flow path and into said particle analyzer at said inlet for real-time detection of the dislodged nanoparticles.

2. The device of claim 1, wherein said particle analyzer is a non-optical particle counter.

3. The device of claim 1, wherein said particle analyzer is an optical particle counter.

4. The device of claim 1, wherein said particle analyzer is a condensation particle counter, and said inlet of said condensation particle counter introduces a sample stream containing said dislodged particles to be analyzed, wherein said condensation particle counter comprises:
a condensate reservoir;
a saturator in fluid communication with said condensate reservoir for introducing a condensate into said sample stream, wherein said condensate is water, methanol, ethanol, propanol, butanol, glycerol, ethylene glycol, diethelyene glycol, propylene glycol, or a combination thereof;
a condenser in fluid communication with said saturator for condensing said condensate onto said dislodged particles contained in said sample stream; and
wherein said particle counter inlet is in fluid communication with said condenser for detecting or characterizing said condensed dislodged particles in said sample stream.

5. The device of claim 4, wherein said device is portable with a total mass less than 20 kg.

6. The device claim 1, wherein said particle analyzer has a differential optical detector comprising:
a plurality of optical detectors each spatially mapped to different portions of an optical beam that interacts with said dislodged particles in said particle analyzer.

7. The device of claim 6, wherein at least a portion of said optical beam is passed through a flow cell containing said dislodged particles and directed onto said plurality of optical detectors.

8. The device of claim 6, wherein said optical detectors are each spatially mapped to portions of said optical beam that are not overlapping.

9. The device of claim 6, wherein said optical detectors are configured for differential detection.

10. The device of claim 6, wherein said optical detectors are configured for split beam detection differential detection.

11. The device of claim 6, wherein said optical beam is selected from the group consisting of: a Gaussian beam, a non-Gaussian beam, a structured beam, and an interferometric beam.

12. The device of claim 1, wherein said ejection system directs energized matter to said surface, and the energized matter is selected from the group consisting of: ionized gas, ultrasonic gas, megasonic gas, cryogenic gas, carbon dioxide snow, atmospheric pressure plasma, and any combination thereof.

13. The device of claim 1, wherein said energized matter is selected from the group consisting of: compressed gas, ionized gas, pulsed gas, ultrasonic gas, megasonic gas, cryogenic gas, carbon dioxide snow, atmospheric pressure plasma, and any combination thereof.

14. The device of claim 12, wherein said energized matter comprises: air, carbon dioxide, argon, nitrogen or any combination thereof.

15. The device claim 1, wherein said ejection system directs energy selected from the group consisting of: ultrasonic or megasonic energy to said surface; thermal energy to thermally excite particles on said surface; and pulses thereof.

16. The device of claim 1, wherein said sample probe comprises a housing configured to be held and moved by a user hand.

17. The device of claim 1, further comprising a machine controller connected to said sample probe for automatic positioning and movement of said sample probe relative to said surface.

18. A method for removing and characterizing nanoparticles on a surface comprising:
directing energized matter, energy or a combination thereof at said surface to dislodge nanoparticles from said surface, wherein said dislodged nanoparticles have an effective diameter less than or equal to 100 nm;
vacuuming said dislodged nanoparticles through a sample probe and into an inlet of a particle analyzer; and
characterizing said dislodged nanoparticles with said particle analyzer, thereby providing real-time detection of the dislodged nanoparticles.

19. The method of claim 18, wherein said particle analyzer is an optical condensation particle counter.

20. The method of claim 18, wherein the particle analyzer is an optical split differential interferometric optical particle counter.

21. A method for removing and characterizing nanoparticles on a surface comprising the steps of:
providing a device comprising:
a condensation particle counter having an inlet;
a sample probe having a sampling port, wherein said sampling port is fluidically connected to said inlet of said condensation particle counter by a flow path;
an ejection system operably connected to said sampling probe, wherein said ejection system directs energized matter, energy or a combination thereof onto said surface to dislodge said nanoparticles from said surface;
a vacuum system operably connected to said sampling port such that said vacuum system forces said dislodged nanoparticles proximate to said sample probe through said sampling port and into said condensation particle counter via said flow path;
directing energized matter, energy or a combination thereof at said surface from said ejection system to thereby dislodge nanoparticles from said surface, wherein said dislodged nanoparticles have an effective diameter less than or equal to 100 nm;
vacuuming said dislodged particles through said sample port in said sample probe and into said condensation particle counter via said flow path; and
characterizing said dislodged nanoparticles using said condensation particle counter, thereby providing real-time detection of the dislodged nanoparticles.

22. The method claim 21, wherein said step of characterizing said particles comprises detecting, sizing, and/or counting said particles.

23. The method of claim 21, wherein said condensation particle counter comprises:
an inlet for introducing a sample stream to be analyzed;
a saturator for introducing a condensate into said sample stream; wherein said saturator is in fluid communication with a condensate reservoir;

a condenser in fluid communication with said saturator for condensing said condensate onto particles contained in said sample stream; and a particle counter in fluid communication with said condenser for detecting or characterizing said particles in said sample stream.

24. The method of claim 23, wherein said directing step comprises: directing carbon dioxide snow at said surface; or thermally exciting particles on said surface.

25. The method of claim 24, wherein said step of directing a fluid or energy at said surface directs a fluid at said surface and said fluid comprises air, carbon dioxide, argon, nitrogen or any combination thereof.

26. The method of claim 24, wherein said directing step comprises: pulsing said fluid; energizing said fluid; ionizing said fluid; or providing said fluid at a cryogenic temperature.

27. The method of claim 26, wherein said directing step directs energy at said surface and said energy is provided at an ultrasonic or a megasonic frequency.

28. The method of claim 23, wherein said characterizing step comprises determining a particle parameter selected from the group consisting of: number of particles; number of particles per unit surface area or particle concentration on the surface; number of particles on the surface; particle cleaning efficacy; particle size; histogram of particle sizes; and any combination thereof.

29. The device of claim 1, wherein said ejection system directs a pulsed liquid comprising one or more surfactants onto said surface and said particle analyzer is a liquid optical particle counter.

30. The method of claim 18, wherein said energized matter is selected from the group consisting of: ionized gas, ultrasonic gas, megasonic gas, cryogenic gas, carbon dioxide snow, atmospheric pressure plasma, and any combination thereof.

31. The method of claim 18, wherein said step of directing comprises directing a pulsed liquid comprising one or more surfactants onto said surface and said particle analyzer is a liquid optical particle counter.

32. The method of claim 21, wherein said energized matter is selected from the group consisting of: ionized gas, ultrasonic gas, megasonic gas, cryogenic gas, carbon dioxide snow, atmospheric pressure plasma, and any combination thereof.

33. The method of claim 21, wherein said step of directing comprises directing a pulsed liquid comprising one or more surfactants onto said surface and said particle analyzer is a liquid optical particle counter.

* * * * *